United States Patent
Geise

(10) Patent No.: US 10,629,984 B2
(45) Date of Patent: *Apr. 21, 2020

(54) COVER FOR A RADAR SENSOR FOR MOTOR VEHICLES

(71) Applicant: Robert Bosch GmbH, Stuttgart (DE)

(72) Inventor: Stephan Geise, Reuthen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,631

(22) Filed: May 15, 2019

(65) Prior Publication Data

US 2019/0267704 A1   Aug. 29, 2019

Related U.S. Application Data

(62) Division of application No. 15/030,030, filed as application No. PCT/EP2014/069775 on Sep. 17, 2014, now Pat. No. 10,381,718.

(30) Foreign Application Priority Data

Oct. 17, 2013  (DE) .................. 10 2013 221 064

(51) Int. Cl.
   *H01Q 1/32*    (2006.01)
   *B29C 45/14*   (2006.01)
   (Continued)

(52) U.S. Cl.
   CPC ..... *H01Q 1/3233* (2013.01); *B29C 45/14434* (2013.01); *B29C 45/1671* (2013.01); *B29C 67/246* (2013.01); *B60R 13/005* (2013.01); *C03B 21/02* (2013.01); *C03B 23/0302* (2013.01); *C03B 40/005* (2013.01); *C03C 17/06* (2013.01); *G01S 7/02* (2013.01);
   (Continued)

(58) Field of Classification Search
   CPC .............. H01Q 1/3233; H01Q 1/422; B29C 45/14434; B29C 45/1671; B29C 67/246; B60R 13/005; C03B 21/02; C03B 23/0302; C03B 40/005; C03C 17/06; G01S 7/02
   See application file for complete search history.

(56) References Cited

U.S. PATENT DOCUMENTS 6,037,912 A   3/2000  DeMarre
6,091,375 A   7/2000  Goto et al.
(Continued)

FOREIGN PATENT DOCUMENTS

DE    103 38 506      10/2004
DE    102005060907     6/2007
(Continued)

OTHER PUBLICATIONS

Anonymous : «GPI Design Guidelines for Molded Sheet Glass», Jul. 30, 2013, pp. 101.
(Continued)

*Primary Examiner* — Dieu Hien T Duong
(74) *Attorney, Agent, or Firm* — Norton Rose Fulbright US LLP; Gerard Messina

(57) ABSTRACT

A cover for a radar sensor for motor vehicles, which has a wall provided with a three-dimensional relief structure, in which the wall including the relief structure is made of deep-drawn glass.

15 Claims, 4 Drawing Sheets

(51) Int. Cl.
  B29C 45/16    (2006.01)
  B29C 67/24    (2006.01)
  B60R 13/00    (2006.01)
  C03B 23/03    (2006.01)
  H01Q 1/42     (2006.01)
  C03B 40/00    (2006.01)
  C03B 21/02    (2006.01)
  G01S 7/02     (2006.01)
  C03C 17/06    (2006.01)
  B29C 45/56    (2006.01)
  G01S 13/931   (2020.01)
  G01S 13/93    (2020.01)
  B29K 69/00    (2006.01)
  B29K 709/08   (2006.01)
  B29L 31/34    (2006.01)

(52) U.S. Cl.
  CPC ........... *H01Q 1/422* (2013.01); *B29C 45/561* (2013.01); *B29C 2045/14237* (2013.01); *B29K 2069/00* (2013.01); *B29K 2709/08* (2013.01); *B29K 2995/0026* (2013.01); *B29L 2031/3481* (2013.01); *C03C 2217/255* (2013.01); *C03C 2217/268* (2013.01); *G01S 13/931* (2013.01); *G01S 2007/027* (2013.01); *G01S 2013/9375* (2013.01)

(56) References Cited

U.S. PATENT DOCUMENTS

| | | |
|---|---|---|
| 2002/0044101 A1 | 4/2002 | Zimmermann |
| 2008/0252552 A1 | 10/2008 | Goebel et al. |
| 2010/0237655 A1 | 9/2010 | Mehs et al. |
| 2010/0238085 A1* | 9/2010 | Fuh .............. H01Q 13/22 343/771 |
| 2011/0273356 A1 | 11/2011 | Kawaguchi et al. |
| 2012/0119961 A1 | 5/2012 | Mayer Pujadas |
| 2016/0261034 A1* | 9/2016 | Geise ............... B29C 45/14434 |

FOREIGN PATENT DOCUMENTS

| | | |
|---|---|---|
| DE | 102006052316 | 5/2008 |
| DE | 102007059758 | 6/2009 |
| EP | 0954052 | 11/1999 |
| JP | 2001217785 | 8/2001 |
| JP | 2003021500 | 1/2003 |
| JP | 2009 124485 | 6/2009 |
| JP | 2010066152 | 3/2010 |
| JP | 2010 099870 | 5/2010 |
| JP | 2010 111010 | 5/2010 |
| JP | 2010 137401 | 6/2010 |
| JP | 2011093378 | 5/2011 |
| JP | 2013036976 | 2/2013 |
| JP | 2013095997 | 5/2013 |
| WO | 2011/099447 | 8/2011 |

OTHER PUBLICATIONS

Ermert, Martin ; Fedler, Marius : « 2. Projekd KuGlas—Hinterspritzen von Dunnglas und 3D Glasern mt Kunststoff », Sep. 30, 2013, pp. 1-8, www.kunststoff-institut.de/download/1921.

* cited by examiner

COVER FOR A RADAR SENSOR FOR MOTOR VEHICLES

CROSS REFERENCE TO RELATED APPLICATIONS

The present application is a divisional application of U.S. patent application Ser. No. 15/030,030, filed on Apr. 15, 2016, which is a national phase to International Application No. PCT/EP2014/069775, filed Sep. 17, 2014, and claims priority to German Patent Application No. 10 2013 221 064.7, filed on Oct. 17, 2013, all of which are hereby incorporated by reference in their entireties.

FIELD OF THE INVENTION

The present invention relates to a cover for a radar sensor for motor vehicles, which has a wall that includes a three-dimensional relief structure.

BACKGROUND INFORMATION

For example, radar sensors in motor vehicles are used for locating vehicles driving ahead, so that automatic vehicle-to-vehicle ranging is possible. It is desirable to integrate the radar sensor and its cover into the radiator grille and, for example, to place it centrally in the upper region of the radiator grille, so that it has an excellent field of vision and is largely protected from damage by falling stones or the like. It seems also useful that the relief structure of the cover carries the company insignia of the motor vehicle manufacturer.

The cover then has to satisfy a multitude of technical requirements. For one, it must be transparent to radar and should interfere as little as possible with the transmission of the radar waves and also create a minimum of interfering reflections. The company insignia of the motor vehicle manufacturer often includes very shiny surface components and should therefore be effectively protected from environmental influences, so that this surface will not dull and lose its appearance. The outer surface of the radar sensor should be as robust as possible and, in particular, not scratch easily.

A cover of this type is discussed in publication DE 103 38 506.4; however, the production of this cover is very complex and involves a multitude of method steps, so that it is relatively expensive and the risk of faults in the production process is fairly high.

SUMMARY OF THE INVENTION

It is an object of this invention to provide a cover having a three-dimensional relief structure for radar sensors, which can be produced cost-effectively and still is of high optical, radar-optical and mechanical quality.

According to the present invention, this object is achieved in that at least one layer of the wall provided with the relief structure is made of deep-drawn glass.

Different glass manufacturers offer flexible glass plates, which are deformable by deep-drawing, for instance. One example is a borosilicate glass that is distributed by the Corning company under the "Willow Glass" designation.

According to the present invention, this glass is reshaped by deep-drawing such that it forms the three-dimensional relief structure of the cover. The glass composition can be selected so as to achieve high transparency for radar waves, whose frequency typically lies on the order of magnitude of approximately 77 GHz.

The use of the reshaped glass as base substrate for the cover allows high mechanical stability and robustness as well as high optical quality while enabling a simultaneously cost-effective production. Numerous error sources are omitted since fewer method steps are required than in conventional methods, so that the rejected material and thus the component costs are minimized.

Advantageous embodiments and further refinements of the present invention are outlined in the dependent claims.

The appearance of the cover is able to be influenced by imprinting at least portions of the relief structure made from glass and/or a metallization. The imprinted or metallized surfaces may be on the rear side of the cover facing the radar sensor, so that they are protected from environmental influences. Furthermore, a plastic layer can be applied onto the rear side of the metal layer by back-injection molding or injection embossing, which forms a stable and distortion-free composite component together with the glass layer. The injection or injection-embossing method makes it possible to achieve an excellent surface abutment between the glass substrate and the plastic mass, so that no air inclusions occur at which the radar waves would be reflected. At the same time, the plastic mass may be shaped in such a way that it forms support elements for fastening the cover or the entire radar sensor to the radiator grille or to other body shell components of the motor vehicle.

A transparent casting compound or seal of plastic also may be provided on the front side of the cover, which compensates for unevenness of the relief structure, so that a smooth surface is obtained which can then be provided with a scratchproof enamel, e.g., a duroplastic lacquer. Optionally, the depressions of the relief structure on the front side may also be filled by an uninterrupted transparent duroplastic resin layer.

An exemplary embodiment is explained below with the aid of the drawings.

DETAILED DESCRIPTION

Figure 1:
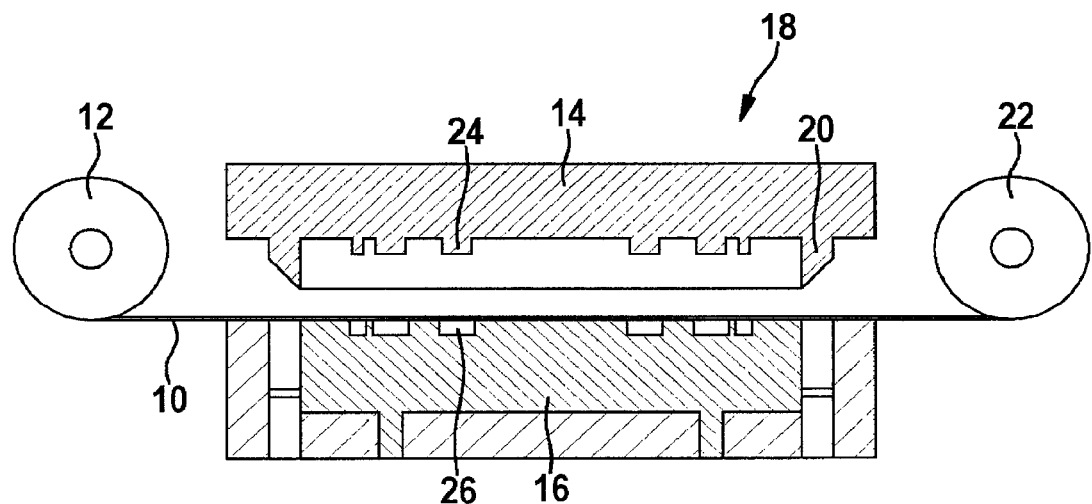
FIG. 1 a schematic section through a device for deep-drawing a transparent glass sheet.

According to FIG. 1, the starting material for producing a cover for a motor vehicle radar sensor is a flexible glass sheet 10, which is drawn off a coil 12 in the form of an endless strip and passes between an upper tool 14 and a lower tool 16 of a punching and deep-drawing device 18. Upper tool 14 has a circumferential punching die 20, with the aid of which a circular blank, for example, is punched out of strip 10. The blanking waste is then wound onto a coil 22 again on the other side of device 18.

On the underside, upper tool 14 has a system of projections 24, while lower tool 16 has a complementary system of depressions 26. When upper tool 14 is lowered, a blank 28 is punched out and deep-drawn by projections 24 and depressions 26, and reshaped in such a way that a three-dimensional relief structure 30 is obtained.

Upper and lower tools 14, 16 are retained in exchangeable fashion in a machine bed 34 of device 18, so that covers that have different relief structures are able to be produced, which, for example, represent the company insignia of the individual motor vehicle manufacturer.

Figure 3:
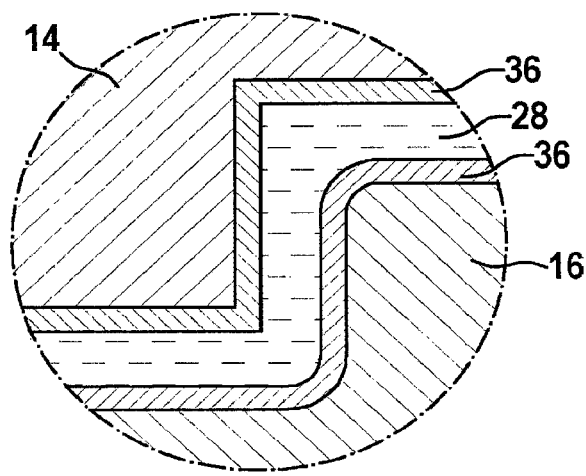
FIG. 3 an enlarged section through a part of the deep-drawn glass sheet in the tool according to FIG. 2.

As FIG. 3 illustrates, the surfaces of upper tool 14 and lower tool 16 facing the blank have coatings 36 made of PTFE (Teflon). This facilitates the deep-drawing operation. The edges of depressions 26 in lower tool 16 are rounded, so that no ugly marks are produced on the side of the blank that later forms the outside of the cover.

Figure 2:
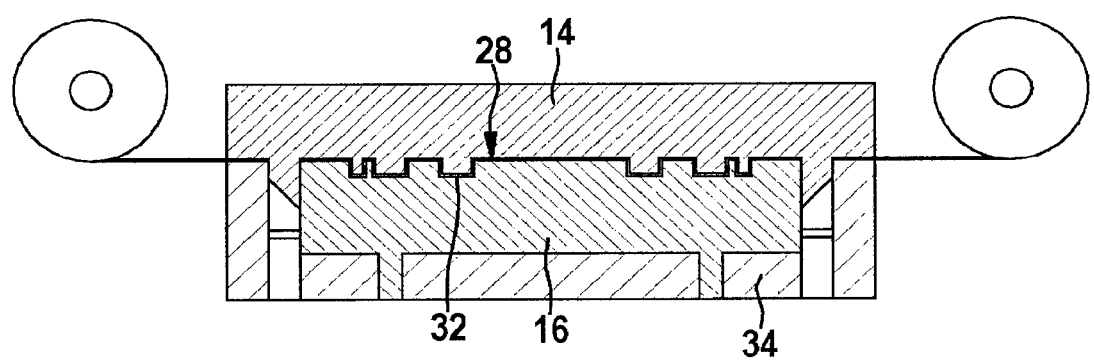
FIG. 2 the device as recited in claim 1, at the end of a deep-drawing step.
Figure 4:
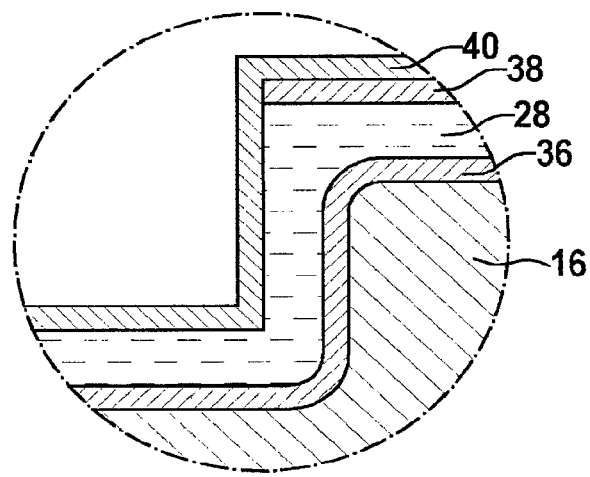
FIG. 4 a section, analogous to FIG. 3, through the glass sheet following additional processing steps.

When upper tool 14 is lifted up, deep-drawn blank 28 is ejected or possibly transferred together with lower tool 16 serving as workpiece support to an imprinting station (not shown here), where the raised parts of relief structure 32 are imprinted using a color enamel on the rear side facing the radar sensor of the subsequent cover (the top side in FIGS. 2 and 3), for instance in a pad printing process. One part of enamel layer 38 formed in this manner is illustrated in FIG. 4.

In a further step, an opaque uninterrupted metallization layer 40 is applied to the entire rear side (top side) of blank 28, which, for example, has a thickness of at least 50 nm and may be made of indium, gold or tin, for reasons of radar transparency.

Figure 5:
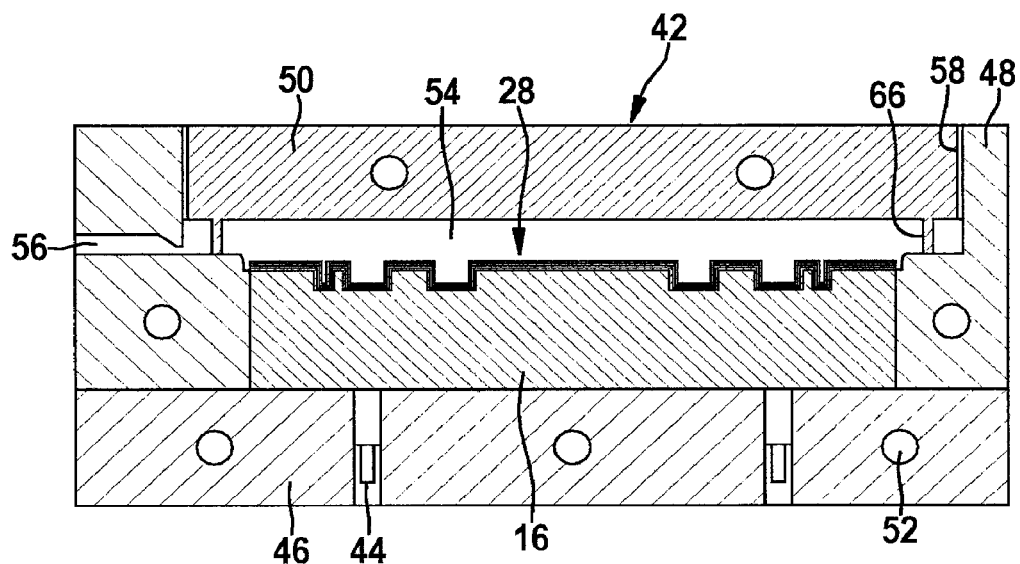
FIG. 5 a schematic section through a device for injection-embossing a plastic layer on the rear side of the glass sheet.

For a subsequent processing step, the imprinted and metal-coated blank 28 is transferred to an injection-molding machine 42 having an embossing functionality, which is shown in FIG. 5 in a sectional view. In this step blank 28 may optionally also remain on lower tool 16 of the stamping and deep-drawing device serving as workpiece support, whereupon the injection-molding device is repositioned and suitably positioned with ejectors 44 in a bed 46 of the injection-molding device. Heating ducts 52 run through bed 46, a circumferential wall 48 as well as an embossing stamp 50 of the injection-molding machine, so that the injection-molding machine together with blank 28 are able to be heated to a temperature of 120 to 140° C., for example.

Circumferential wall 48 and embossing stamp 50 form the boundary of a mold cavity 54 above blank 28, into which a preheated plastic melt is injected via a sprue 56, which may be at a pressure of less than 500 MPa. The plastic, for example, may be a polycarbonate or a duroplastic resin material.

Punch 50 is set apart from the circumferential wall of injection-molding machine 42 by a punch gap 58 and drives deeper into the mold cavity during the injection-molding operation, so that the plastic melt is firmly pressed against the metallization layer of blank 28. This achieves a full-surface adhesion of the plastic to the metallization layer of the blank without air inclusions. The adhesion can be improved further by subjecting metallization layer 40 to a plasma treatment prior to the injection-molding procedure.

Figure 7:
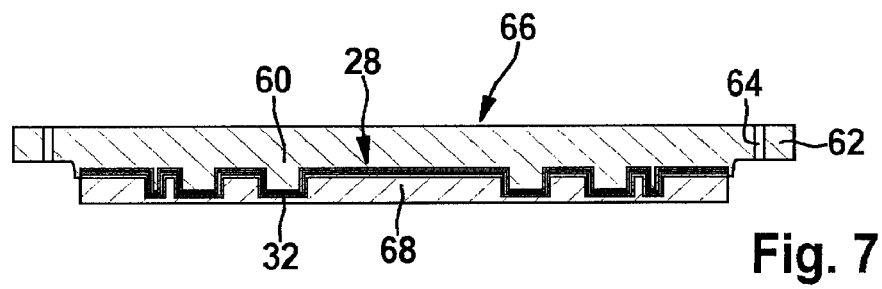
FIG. 7 a section through a finished cover for a radar sensor.
Figure 8:
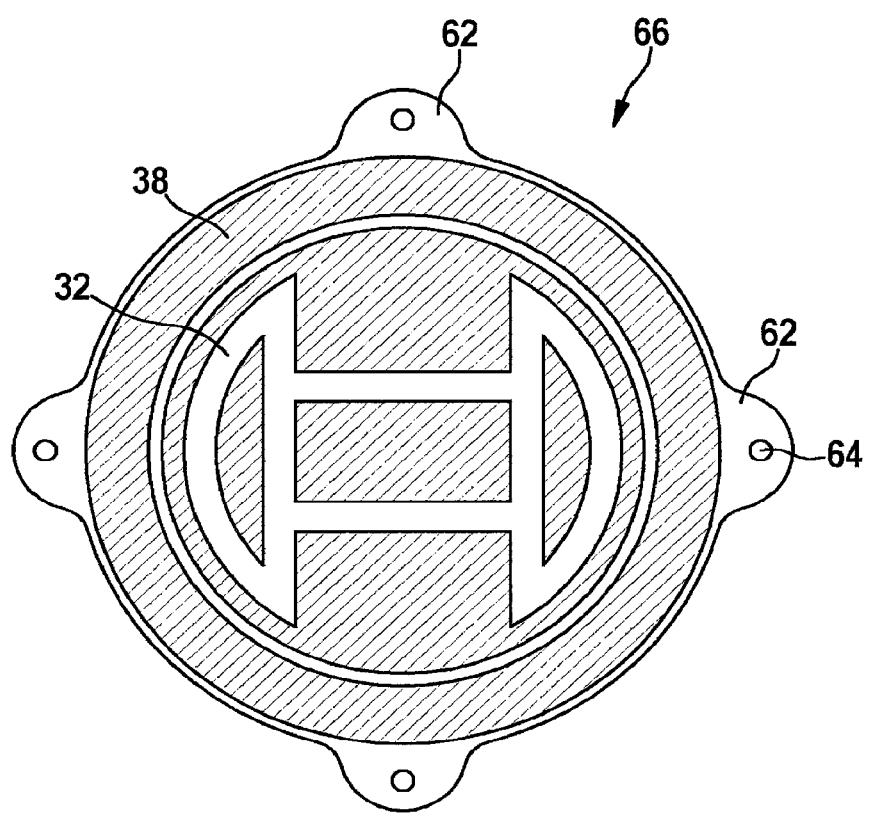
FIG. 8 a front view of the cover according to FIG. 7.

Mold cavity 54 is configured in such a way that the circumferential edge of the blank is embedded in the plastic mass, and plastic layer 60 produced by the injection molding (FIGS. 6 and 7) forms radially projecting mounts 62 including fastening holes 64 at its edge, which make it possible to fix the cover in place on a radiator grille or some other body part of the motor vehicle (see also FIG. 8).

After plastic layer 60 has cooled in injection-molding machine 42, cover 66 created by plastic layer 60 together with adhering blank 28 (FIGS. 7 and 8) is demolded, and lower tool 16 is ejected as well with the aid of ejectors 46 and returned for further use to stamping and deep-drawing device 18.

Cover 66 may be used in the condition in which it leaves injection-molding machine 42. However, in a further step using the same or some other injection-molding machine, it is optionally possible to apply a filler layer to the front side (underside) of the blank by an injection-molding step, similar to filler layer 68 illustrated in FIGS. 6 and 7. As a minimum, this filler layer fills the depressions of the relief structure, but may form a continuous planar surface on the outer side of the cover; it is made of transparent plastic, such as a transparent polycarbonate, so that the relief structure remains visible. If needed, the planar surface of the filler layer is able to be coated by scratch-proof transparent enamel.

Figure 6:
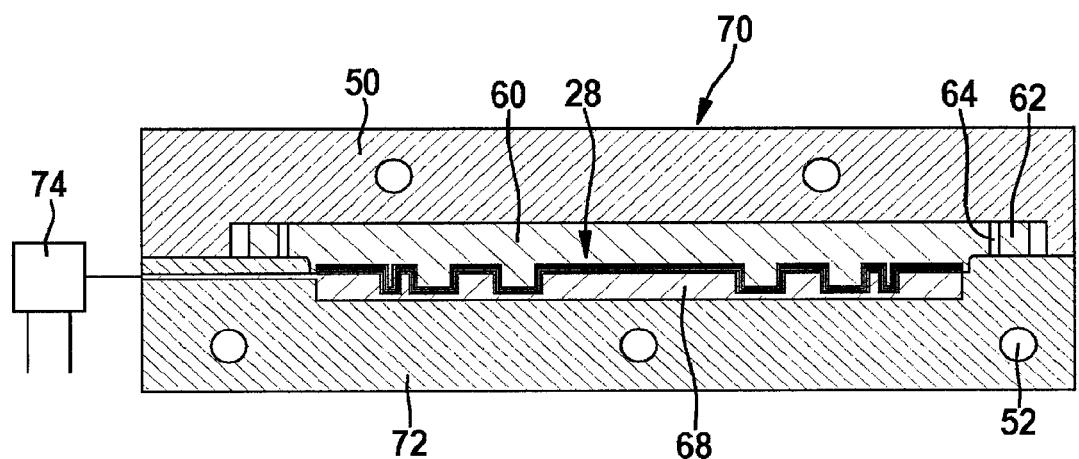
FIG. 6 a section through a device for applying a casting compound to a front side of the glass sheet.

FIG. 6 illustrates a further specific embodiment, in which filler layer 68 is produced in a casting machine 70 with the aid of a simple casting tool 72 by the reaction-injection molding method (RIM). Low-viscosity casting compounds, such as on the basis of polyurethane or acrylate, may be used for this purpose. An isocyanate and a polyol, for example, are combined in a mixer head 74, and injected into the heated tool at a pressure of less than 500 MPa. A cross-linked resin, which is very stable with regard to temperature and shape and which forms a scratch-proof planar surface that no longer needs to be enameled, is then produced in the mold cavity by way of a chemical reaction.

Finished cover 66 obtained in such a manner is shown in a sectional view in FIG. 7 and in a front view in FIG. 8.

What is claimed is:

1. A method for producing a cover, the method comprising:
   reshaping a blank of flexible glass into a relief structure, wherein the blank forms a supporting substrate of the cover;
   wherein the cover is for a radar sensor for the motor vehicle, and includes a wall provided with a three-dimensional relief structure having multiple depressions and/or projections, the wall having the three-dimensional glass relief structure being made of deep-drawn glass, which is a reshaped flexible glass sheet,
   wherein a composition of the deep-drawn glass provides high transparency to high-frequency radar waves,
   wherein the high frequency radar waves are about 77 GHz, and
   wherein corner edges of the relief structure are rounded at least on the outwardly pointing side in relation to the radar sensor.

2. The method of claim 1, wherein the relief structure is imprinted and/or metallized on at least one side.

3. The method of claim 1, wherein a plastic layer is applied on one side of the blank with the aid of the injection-embossing method.

4. The method of claim 1, wherein a filler layer from a transparent casting compound which cures by cross-linking is formed on one side of the blank in the reaction-injection molding method.

5. The method of claim 1, wherein a filler layer from a transparent casting compound which cures by cross-linking is formed on one side of the blank, which is on a blank and non-metallized side, in the reaction-injection molding method.

6. The method of claim 1, wherein a plastic layer is applied on one side of the blank, which is on the imprinted and/or metallized side, with the aid of the injection-embossing method.

7. The method of claim 1, wherein the relief structure is imprinted on at least one side.

8. The method of claim 7, wherein the wall of deep-drawn glass has a continuous metallization layer on the imprinted side, which covers the imprinting.

9. The method of claim 1, wherein the relief structure is metallized on at least one side.

10. The method of claim 1, wherein a plastic layer is applied on at least one side of the wall of deep-drawn glass.

11. The method of claim 10, wherein the plastic layer forms a frame for the edge of the wall of deep-drawn glass.

12. The method of claim 10, wherein the plastic layer forms at least one mount for fastening the cover to a body shell part.

13. The method of claim 1, wherein a transparent filler layer is applied on one side of the wall of deep-drawn glass.

14. The method of claim 13, wherein the filler layer forms a continuous planar surface, which is provided with a scratch-proof enamel layer.

15. The method of claim 1, wherein a transparent filler layer is applied on one side of the wall of deep-drawn glass, the one side being a blank and non-metallized side.

\* \* \* \* \*